United States Patent Office 3,529,029
Patented Sept. 15, 1970

3,529,029
HYDROGENATION OF AROMATIC HYDROCARBONS
Ernest L. Pollitzer, Skokie, Ill., assignor to Universal Oil Products Company, Des Plaines, Ill., a corporation of Delaware
No Drawing. Continuation-in-part of application Ser. No. 723,886, Apr. 24, 1968. This application Apr. 7, 1969, Ser. No. 814,174
Int. Cl. C07c 5/10
U.S. Cl. 260—667        5 Claims

ABSTRACT OF THE DISCLOSURE

Aromatic hydrocarbons are hydrogenated to the corresponding cycloparaffins with negligible yield loss to gaseous waste material. Hydrogen and aromatic hydrocarbons (benzene) are contacted with a catalytic composite containing a Group VIII noble metal component, an alkalinous metal component and a Group VII–B metal component having an atomic number greater than 25, to produce cycloparaffinic hydrocarbons (cyclohexane).

RELATED APPLICATION

The present application is a continuation-in-part of my copending application, Ser. No. 723,886, filed on Apr. 24, 1968, all the teachings of which copending application are incorporated herein by specific reference thereto.

APPLICABILITY OF INVENTION

The present invention encompasses a process for effecting the hydrogenation of aromatic hydrocarbons such as benzene, toluene, the various xylenes, naphthalenes, etc., to form the corresponding cyclic paraffins. When utilized for the hydrogenation of aromatic hydrocarbons which are contaminated by sulfurous compounds, especially thiophenic compounds, the present inventiin is advantageous in that it affords 100.0% conversion without the necessity for the substantially complete prior removal of the sulfur compounds. More specifically, the present invention is directed toward a process for the hydrogenation of sulfur-contaminated benzene to form substantially pure cyclohexane, which process is effected through the utilization of a particular catalyst, and under certain conditions of operation.

In addition to those aromatic hydrocarbons mentioned above, my invention affords advantages to the hydrogenation of substituted aromatic hydrocarbons such as ethylbenzene, di-ethylbenzene, and various mono-, di-, and tri-substituted aromatic hydrocarbons, etc. The corresponding cyclic paraffins, resulting from the hydrogenation of the aromatic nuclei, inclue compounds such as cyclohexane, mono-, di, tri-substituted cyclohexanes, decalin (decahydronaphthalene) tetralin (tetrahydronaphthalene, etc.) Cycloparaffinic hydrocarbons are extensively utilized in commercial industries for a wide variety of purposes. For example, cyclohexane is used in exceedingly large quantities in the manufacture of nylon, and as a solvent for various fats, oils, waxes, etc. Cyclohexane is often employed in the manufacture of crude rubber and various resins, and is used as a component of paint and varnish remover. Moni-, di-, and tri-substituted cyclohexanes can be utilized as starting materials in various organic syntheses. Decalin is used as an organic solvent for heavier fats and oils, as a stain remover, as a substitute for turpentine, etc. Tetralin finds use as a solvent for various resinates, for asphaltic material, as an ingredient in shoe polish, etc. The greater majority of uses dictate that the cycloparaffin, for example cyclohexane, exist in a substantially pure state, and particularly uncontaminated by the corresponding aromatic hydrocarbon.

In the interest of brevity, the following discussion will be directed toward the hydrogenation of benzene to form substantially pure cyclohexane. It is understood that the method of the present invention may be utilized to advantage in hydrogenation processes regardless of the character of the aromatic hydrocarbon which is to be converted. Although cyclic paraffins are readily found in various petroleum hydrocarbon fractions and/or distillates, and often in substantial quantities, it is very difficult to effect recovery thereof by distillation due to the tendency of the cyclic paraffins to form azeotropic mixtures. On the other hand, however, a series of distillation and/or extraction procedures may be utilized to obtain substantially pure aromatic hydrocarbons. For example, a benzene-containing fraction, such as a full boiling range naphtha (150° F. to about 400° F.) may be subjected to fractional distillation to provide a heart-cut which contains the benzene. The benzene-containing heart-cut is then subjected to a solvent extraction process which separates the benzene from the normal or iso-paraffinic components, and naphthenes contained therein. Benzene is readily recovered from the selected solvent by way of distillation. In this manner, a benzene concentrate, as well as other aromatic hydrocarbons, may be obtained in a purity of 99%, or more.

Heretofore, the hydrogenation of aromatic hydrocarbons has been effected with a nickel-containing catalytic composite at hydrogenation conditions. Nickel-containing catalyst is disadvantageous in many respects, and especially from the standpoint that nickel is quite sensitive to the sulfurous compounds contained in the benzene concentrate. Regardless of the source of benzene, the greater proportion of the contaminating influences therein are sulfurous compounds. The nickel-containing catalysts become deactivated through an inter-reaction with the sulfurous compounds, whereby the nickel component is converted into a sulfide. Notwithstanding that the formation of nickel sulfide is at least partially reversible, even under the most conducive conditions the reaction is not reversible to the extent that a sufficient quantity of the nickel component becomes catalytically active for effecting additional hydrogenation. The nickel-containing catalyst, although fairly active initially, does not possess sufficient stability.

Some processes, described in the prior art, rely upon a catalytic composite containing a Group VIII noble metal component, particularly a platinum and/or palladium component. Although the Group VII noble metal component, for example platinum, is also converted into platinum sulfide, the prior art indicates that the reaction is more readily reversible than that involving the nickel component, and that the reaction tends to reverse as the temperature of the catalyst is increased. However, an increase in reaction temperature promotes a corresponding increase in reactions other than hydrogenation, whereby the aromatic nuclei are converted to hydrocarbons other than the desired cycloparaffin. Since the rate at which the formation of platinum sulfide reverses is proportional to the quantity of hydrogen sulfide within the reaction zone, a prior art solution to the problem is a hydrogen sulfide removal system. This generally involves intricate treating facilities including a caustic wash treatment followed by water washing to remove traces of caustic from the hydrogen-enriched gaseous phase intended for recycle to the reaction zone. Such a system is subject to extremely careful control to insure that excessive quantities of caustic are not carried into the reaction zone, thereby upsetting the delicate balance of the catalytic composite, notwithstanding that the catalytic composite includes an alkali metal component for the purpose of attenuating the inherent cracking activity possessed by Group VIII noble metals, and which results from residual halogen as hereafter set forth. It should further be noted that the prior art use of the alkali metal component is preferably limited to a quantity less than 1.0% by weight, and more often in the range of about 0.01% to about 0.75% by weight. It is generally conceded that concentrations of the alkali metal component, in excess of about 0.75% by weight tend to upset the balance between inhibiting the occurrence of side reactions, and imparting the desired degree of activity and stability to the platinum-containing catalyst.

The preferred catalyst, for use in my invention, is such that the inherent cracking activity is attenuated to a more substantial degree without adversely affecting the capability of the catalyst with respect to hydrogenation activity and selectivity. This is accomplished by the incorporation of a Group VII–B metal component, having an atomic number greater than 25. Thus, the preferred catalytic composite contains a rhenium component and/or a technetium component, to the exclusion of a manganese component, the latter being incapable of providing the required hydrogenation activity and stability. Furthermore, the preferred catalytic composite appears to possess an exceptional degree of sulfur tolerability to the extent that intricate, exotic hydrogen sulfide removal facilities are not critical to successful operation. Indications are that the catalytic composite for use in my invention can tolerate sulfur to the extent of about 35.0 p.p.m. by weight in the hydrocarbon feed stream.

OBJECTS AND EMBODIMENTS

A principal object of the present invention is to hydrogenate aromatic hydrocarbons to the corresponding cycloparaffinic hydrocarbons. A corollary objective involves providing stability and selectivity in a process for the hydrogenation of substantially pure aromatic hydrocarbons contaminated by the inclusion of sulfurous compounds. A specific object of my invention involves a process for the hydrogenation of sulfur-contaminated aromatic hydrocarbons, which process does not require complicated and difficult-to-control hydrogen sulfide removal facilities.

Therefore, one embodiment of my invention affords a process for hydrogenating aromatic hydrocarbons which comprises contacting hydrogen and said aromatic hydrocarbons in a reaction zone, at hydrogenating conditions and in contact therein with a catalytic composite containing a Group VIII noble metal component, an alkalinous metal component and a Group VII–B metal component, having an atomic number greater than 25.

A more limited embodiment encompassed by the present invention involves a process for producing a cycloparaffinic hydrocarbon from an atomic hydrocarbon, which process comprises contacting hydrogen and said aromatic hydrocarbon in a reaction zone, at a catalyst temperature of from about 200° F. to about 800° F. and a pressure of from 100 to about 2,000 p.s.i.g., in contact with a non-acidic catalytic composite containing 0.01% to about 2.0% by weight of a Group VIII noble metal component, from about 0.01% to about 2.0% by weight of a Group VII–B metal component, having an atomic number greater than 25, and from about 0.01% to about 1.5% by weight of an alkalinous metal component, separating the resulting reaction zone effluent to provide a hydrogen-rich vaporous phase and to recover said cycloparaffinic hydrocarbon.

Other embodiments of my invention are directed toward preferred processing techniques, operating conditions, as well as various compositions of the catalytic composite for utilization therein. Other objects and embodiments will become evident from the following, more detailed description of my invention.

DESCRIPTION OF CATALYTIC COMPOSITES

The catalytic composites preferably utilized in the present process comprise metallic components selected from the metals, and compounds thereof, of Groups VII–B, I–A, II–A, and VIII of the Periodic Table. Thus, in accordance with the Periodic Table of The Elements, E. H. Sargent & Co., 1964, suitable metallic components are selected from the group consisting of ruthenium, rhodium, palladium, osmium, iridium, platinum, lithium, sodium, potassium, rubidium, cesium, beryllium, magnesium, calcium, strontium, and, in some instances, barium. It should be noted that the metals selected from Group VII–B, technetium and rhenium, have atomic numbers greater than 25. The use of manganese in the catalytic composite does not result in the desired degree of hydrogenation selectivity and catalyst stability.

While neither the precise composition, nor the method of manufacturing the catalyst is an essential element of my invention, certain considerations are preferred. For example, since the fresh feed to the present process is an aromatic concentrate, and the desired normally liquid product effluent is a cycloparaffinic concentrate, the catalytic composite should not possess the propensity to promote ring-opening and/or hydrocracking reactions. Thus, the catalytic composite employed herein is substantially free from "acid-acting" components, and is herein referred to as being "non-acidic." For example, the catalytically active metallic components hereinabove set forth, are preferably combined with a non-siliceous, substantially halogen-free carrier material such as alumina. A substantially "halogen-free" composite is one wherein halogen is not intentionally added as a component, and, in those instances where a halogen component (chloroplatinic acid) is employed in the catalyst manufacturing process, steps are taken to reduce the halogen content to the lowest possible level.

The alumina carrier material may be prepared in any suitable manner, and may be activated prior to use by one or more treatments including drying, calcination, steaming, etc. Since the precise method of preparing the carrier material is not essential to my invention, detailed discussion is not believed necessary to a clear understanding of the present process. Briefly, the carrier material may be formed in any desired shape such as spheres, pills, cakes, extrudates, powders, granules, etc. A particularly preferred form is the sphere; and, spheres may be continuously manufactured by the well-known oil drop method which comprises forming an alumina hydrosol by any of the techniques taught in the art, combining the hydrosol with a suitable gelling agent and dropping the resultant mixture into an oil bath maintained at elevated temperatures. Further details for the production of spherical alumina particles may be found in U.S. Pat. No. 2,620,314.

As hereinbefore stated, a halogen-containing compound is often utilized during one or more steps of the overall catalyst manufacturing technique. For example, alumina is commonly prepared by a method which involves digesting substantially pure aluminum metal in hydrochloric acid, and a Group VIII noble metal is often impregnated throughout the finished alumina through the use of, for example, chloropalladic acid or chloroplatinic acid. Since it is extremely difficult to reduce the concentration of combined halogen to a level lower than about 0.1% by weight, the undesirable acidity imparted thereby is countered and inhibited through the use of the alkalinous metal component.

The alkalinous metal component, employed for the purpose of attenuating the acid-function possessed by residual halogen, by the carrier material, and/or by the Group VIII noble metal component, is selected from the group of lithium, sodium, potassium, rubidium, cesium, beryllium, magnesium, calcium, strontium, barium and mixtures thereof. Regardless of the particular state in which the component exists within the final catalytic composite, the quantities thereof, from about 0.01% to about 1.5% by weight, and preferably from about 0.1% to about 1.0%, are calculated as if the component existed in the elemental state. It is a general procedure to incorporate the alkalinous metal component during the preparation of the carrier material; therefore, the carrier material is often referred to as, for example, "lithiated alumina." Another method, sometimes preferred, calls for impregnating the alkali metal last in order to facilitate distribution of the other metal components.

The Group VIII noble metal component, selected from the group of ruthenium, osmium, rhodium, iridium, palladium, platinum and mixtures thereof, is used in an amount of from about 0.01% to about 2.0% by weight, calculated as if existing in the elemental state. The Group VII–B metallic component, selected from technetium and/or rhenium, is also utilized in an amount within the range of from about 0.01% to about 2.0% by weight. Both the Group VIII noble metal component and the Group VII–B metallic component may be incorporated within the catalytic composite in any suitable manner including co-precipitation with the carrier, or impregnation of the carrier material with a suitable water-soluble compound of the metal. Following the incorporation of the metallic components, for example by way of impregnation, the carrier material is dried and subjected to a high temperature calcination technique, which technique is thoroughly described within the prior art. A particularly preferred catalytic composite comprises alumina, platinum, lithium and rhenium. Excellent results are achieved with a catalyst containing from about 0.1% to about 1.0% by weight of lithium, 0.3% to about 0.9% by weight of platinum, and 0.1% to about 0.8% by weight of rhenium.

While advantageous results are achieved with a catalytic composite having a Group VII–B/noble metal weight ratio in the range of from about 0.01:1 to about 2:50:1, it is preferred that the catalyst contain an excess of the noble metal component compared to the Group VII–B metal component. The final catalytic composite will generally be dried at a temperature of from about 200° F. to about 600° F., for a period of from about 2 to about 24 hours. The dried composite is then calcined at a temperature of from about 700° F. to about 1100° F., and for a period of about 0.5 to about 10 hours.

PROCESS CONDITIONS AND TECHNIQUES

Although the process encompassed by my invention may be conducted in a single reaction zone, the more advantageous utilization involves a plurality of reaction zones, the flow through which is in part in series, and in part in parallel. Although any suitable number of reaction zones may be employed, the use of three reaction zones is preferred. Two reaction zones do not appear to result in as complete a conversion of the benzene to cyclohexane without the use of unnecessarily high temperatures which inherently result in the undesirable side reactions. More than three reaction zones does not appear to yield additional benefits, and are, therefore, considered uneconomically feasible. Although not necessary to my invention, the total volume of catalyst employed in the process is divided into approximately equal portions, each of which is disposed within one of the three reaction zones. Similarly, the process is facilitated when the total fresh benzene feed is added in three approximately equal portions, one each to the inlet of each of the three reaction zones. While the benzene, therefore, passes in parallel flow through the reaction zones, the hydrogen and cyclohexane recycle (the source of which is hereinafter set forth) passes in series flow through the reaction zones. Since the reaction is exothermic in nature, this particular series-parallel flow pattern permits a temperature rise in each zone to be limited to an allowable value, by restricting the quantity of benzene in the reactant mixture introduced to an individual reaction zone.

Approximately one-third of the total benzene fresh feed is commingled with recycled cyclohexane and hydrogen, a part of the latter being recycled from the last reaction zone, the remainder supplemented by make-up hydrogen, and is charged to the first reaction zone. The mixture is previously heated to a temperature such that the maximum catalyst bed temperature is 200° F. to 800° F. Cyclohexane is utilized in an amount approximately three times the volumetric quantity of benzene charged to the reaction zone; the hydrogen is employed in an amount sufficient to yield a mol ratio of hydrogen to cyclohexane, in the effluent from the last reaction zone, not substantially less than about 4.0:1. The total effluent leaves the first reaction zone at a temperature of about 500° F., and although a temperature profile indicates a peak temperature as high as 700° F., the utilization of the particular catalyst has been found to yield little or no hydrocracking whereby undesirable straight-chain hydrocarbons are formed.

The effluent from the first reaction zone is commingled with another portion of benzene, again equal to approximately one-third of the total fresh benzene feed to the process. This mixture is then cooled, where necessary, to a temperature of about 300° F., prior to entering the second reaction zone. Similarly, the effluent from the second reaction zone is commingled with approximately one-third of the total benzene charge, subsequently cooled to a temperature of about 300° F., and is introduced into the last reaction zone. The liquid hourly space velocity relates to the total quantity of benzene in parallel flow to the reaction zones, and the total of catalyst disposed in the plurality of reaction zones, and is generally in the range of from about 1.0 to about 10.0. The total effluent from the last reaction zone in the series is passed into a high pressure separator, at a temperature of from about 60° F. to about 140° F., wherein it is separated into two phases. A hydrogen-rich vaporous phase is removed from the high pressure separator and recirculated to the first reaction zone as a portion of the hydrogen necessary for the reaction; at least a portion of the liquid phase, being substantially pure cyclohexane is recycled to the inlet of the first reaction zone in an amount such that the mol ratio of cyclohexane to the total quantity of benzene passing in parallel flow to said reaction zones is in the range of from about 0.5:1 to about 10:1. The remaining portion of the cyclohexane-containing product stream is passed to suitable fractionation/distillation facilities in order to recover the cyclohexane in a substantially pure state.

The process of the present invention, when effected in accordance with the conditions stated herein, is capable of producing a cyclohexane stream of greater than 99.5% purity, in yields of 100.0% for an extended period of time, and without the need for frequent expensive shut-downs necessitated by a deactivated catalyst.

Since the hydrogenation of aromatic hydrocarbons, to the corresponding cycloparaffins, involves the consumption of at least 3 mols of hydrogen per mol of aromatic hydrocarbon, make-up hydrogen is introduced to the system from any suitable source. Catalytic reforming processes produce large quantities of a highly concentrated, hydrogen-rich gas stream, and thus, is one of the more suitable sources of make-up hydrogen. Although the reaction zones may be maintained under an imposed pressure within the range of about 100 p.s.i.g., to about 2000 p.s.i.g., it is advantageous to utilize an intermediate pressure of about 300 to about 1000 p.s.i.g. Higher pressures tend to promote the hydrogenation of the aromatic nuclei, but likewise increase the degree of hydrocracking and ring-opening whereby low molecular weight, straight-chain paraffinic hydrocarbons are formed. The formation of such light hydrocarbons results in a decrease in the volumetric yield of cyclohexane.

EXAMPLE

The following example is presented to illustrate further the utility of the present invention, and also to indicate the benefits afforded through the utilization thereof. It is not intended that this illustrative example limit the present invention to the concentrations, reagents, and/or operating conditions employed herein. The catalyst utilized is a substantially halogen-free alumina carrier material combined with about 0.375% by weight of rhenium, 0.375% by weight of platinum and about 0.80 by weight of lithium. The incorporation of the platinum and rhenium involves the simultaneous impregnation of the alumina particles with a single aqueous impregnating solution of perrhenic acid and chloroplatinic acid. Following a series of water washing procedures, to reduce the chloride level to as low a value as possible, drying and calcination, the composite is re-impregnated with an aqueous solution of lithium nitrate. The finally impregnated spherical particles are dried at a temperature of about 300° F. for a period of about 4 hours, and subsequently calcined for a period of about 5 hours at a temperature of about 1100° F., and in an atmosphere of air.

For the purposes of illustration, the process will be described in connection with a commercially-scaled unit having a fresh benzene feed capacity approximating 2000 barrels per day. In the instant illustration, the fresh benzene feed rate is about 1940 barrels per day, and it is intended to maximize the yield of cyclohexane. The fresh benzene feed, recovered from a solvent extraction unit, contains approximately 20.0 p.p.m. by weight of sulfur; however, no provision is made for recycle gas scrubbing for hydrogen sulfide removal. The commercial unit is designed such that the fresh benzene feed is introduced in parallel flow to three reactors: the feed to the first reactor is in an amount of 690 barrels per day (113.98 mols per hour); that to the second reaction zone is 700 barrels per day (115.63 mols per hour); and, the fresh feed to the third reaction zone is 550 barrels per day (91.08 mols per hour).

Prior to entering the first reaction zone, the fresh benzene feed is admixed with 1590.82 mols per hour of a hydrogen-rich make-up gaseous phase from a catalytic reforming unit (comprising 1066.33 mols of hydrogen and 1.43 mols of benzene), a recycle cyclohexane concentrate in an amount of 173.62 mols per hour, and an internally recycled hydrogen-rich stream in an amount of 2066.29 mols per hour. Following suitable heat-exchange with various hot effluent streams, the total feed to the first reaction zone is at a temperature of about 290° F., as measured at the inlet to the catalyst bed. The pressure imposed upon the first reaction zone is 490 p.s.i.g. The reaction zone effluent is at a temperature of about 480° F. and a pressure of about 480 p.s.i.g.

The total effluent from the first reaction zone is utilized as a heat-exchange medium, in a steam generator, whereby the temperature is reduced to a level of about 330° F. The cooled effluent is admixed with 115.63 mols per hour of fresh benzene feed (at 100° F.); the resulting temperature is 290° F., and the mixture enters the second reaction zone at a pressure of about 470 p.s.i.g. The second reaction zone effluent, at a pressure of 460 p.s.i.g. and a temperature of 472° F., is also utilized as a heat-exchange medium to generate steam, whereby the temperature is reduced to a level of about 320° F. Upon being admixed with 91.08 mols/hr. of fresh benzene feed, the temperature is again 290° F., and the mixture enters the third reaction zone at a pressure of about 450 p.s.i.g. The third reaction zone effluent is at a temperature of about 429° F. and a pressure of 440 p.s.i.g. Again, through utilization as a heat-exchange medium, the temperature is reduced to a level of 236° F., and subsequently reduced to a level of 120° F. by use of an air-cooled condenser. The cooled third reaction zone effluent is introduced into a high pressure separator, at a pressure of about 400 p.s.i.g.

A hydrogen-rich vaporous phase is withdrawn from the high pressure separator and recycled by way of compressive means at a pressure of about 490 p.s.i.g., to the inlet of the first reaction zone. A portion of the normally liquid phase, withdrawn from the high pressure separator, is recycled to the first reaction zone as the cyclohexane concentrate hereinbefore described. The remainder of the normally liquid phase is passed into a stabilizing column functioning at an operating pressure of 260 p.s.i.g., a top temperature of about 160° F. and a bottom temperature of about 430° F. The cyclohexane product is withdrawn from the stabilizer as a bottom stream, and the overhead stream is combined with the vent gas withdrawn from the high pressure separator for pressure control purposes, the mixture being subjected to refrigerated cooling to separate light normally liquid hydrocarbons. The cyclohexane concentrate is recovered in an amount of about 321.49 mols per hour, of which only 0.16 mol per hour constitutes other hexanes. The following table presents the component analysis of the overall vent gas stream and the light hydrocarbon product stream recovered from the refrigerated cooler.

TABLE.—ANALYSIS, VENT GAS AND RECOVERED LIQUID

| Component, mols/hr. | Gas | Liquid |
|---|---|---|
| Hydrogen | 99.93 | |
| Methane | 252.30 | |
| Ethane | 158.92 | |
| Propane | 85.59 | |
| Butanes | | 28.48 |
| Pentanes | | 2.92 |
| Hexanes | | |
| Benzene | | 0.76 |
| Cyclohexane | | 0.76 |

By way of brief summation, the fresh benzene feed is in an amount of 1940 barrels per day, or 25,049 lbs./hr., or 320.69 mols per hour. The cyclohexane product stream is 2367 barrels per day, 27,055 lbs. per hour, or 321.49 mols per hour, including 0.16 mol per hour of other hexanes.

The foregoing specification and example clearly indicate the method by which the process encompassed by my invention is effected, and indicates the benefits to be afforded through the utilization thereof in the hydrogenation of substantially pure aromatic hydrocarbons to produce cycloparaffinic hydrocarbons.

I claim as my invention:

1. A process for producing a cycloparaffinic hydrocarbon from an aromatic hydrocarbon which comprises contacting hydrogen and said aromatic hydrocarbon in a reaction zone, at a catalyst temperature of from about 200° F. to about 800° F. and a pressure of from 100 to about 2,000 p.s.i.g., in contact with a non-acidic alumina supported catalytic composite containing 0.01% to about 2.0% by weight of a Group VIII noble metal component selected from the group consisting of platinum and palladium, from about 0.01% to about 2.0% by weight of a rhenium component, and from 0.01% to about 1.5% by weight of an alkali metal component, calculated as elements, separating the resulting reaction zone effluent to provide a hydrogen-rich vaporous phase and to recover said cycloparaffinic hydrocarbon.

2. The process of claim 1 further characterized in that said cycloparaffinic hydrocarbon is cyclohexane and said aromatic is benzene.

3. The process of claim 1 further characterized in that said reaction zone comprises a plurality of reaction zones, said hydrogen passes in series-flow from the first to the last of said reaction zones and said aromatic hydrocarbon passes in parallel flow into each of said reaction zones.

4. The process of claim 3 further characterized in that a portion of the cycloparaffinic hydrocarbon is recycled to the inlet of said first reaction zone.

5. The process of claim 1 further characterized in that said alkali metal component is a lithium component.

(References on following page)

References Cited

UNITED STATES PATENTS

| | | | |
|---|---|---|---|
| 3,438,888 | 4/1969 | Spurlock | 208—138 |
| 3,415,737 | 12/1968 | Kluksdahl | 208—139 |
| 3,434,960 | 3/1969 | Jacobson et al. | 208—138 |
| 3,236,765 | 2/1966 | Erbelding | 208—254 |
| 3,410,787 | 11/1968 | Kubicek | 208—57 |
| 3,448,163 | 6/1969 | Howman. | |
| 2,776,934 | 1/1957 | Weller | 260—667 |
| 3,054,833 | 9/1962 | Donaldson et al. | 260—667 |

FOREIGN PATENTS

| | | |
|---|---|---|
| 1,479,935 | 5/1967 | France. |
| 6,501,529 | 8/1966 | Netherlands. |
| 220,611 | 4/1962 | Austria. |

DELBERT E. GANTZ, Primary Examiner

V. O'KEEFE, Assistant Examiner